(12) United States Patent
Furuhashi et al.

(10) Patent No.: US 7,188,103 B2
(45) Date of Patent: Mar. 6, 2007

(54) SIMILARITY SEARCH OF THREE-DIMENSIONAL MODEL USING TWO-DIMENSIONAL IMAGE AS SEARCH KEY

(75) Inventors: Yukihito Furuhashi, Hachioji (JP); Hiroshi Matsuzaki, Hachioji (JP); Takao Shibasaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 430 days.

(21) Appl. No.: 10/713,521

(22) Filed: Nov. 14, 2003

(65) Prior Publication Data
US 2004/0103093 A1    May 27, 2004

(30) Foreign Application Priority Data
Nov. 15, 2002 (JP) ............................. 2002-332177

(51) Int. Cl.
*G06F 17/30* (2006.01)

(52) U.S. Cl. ......................................................... 707/3
(58) Field of Classification Search .................... 707/1, 707/2, 9, 10, 200; 345/582
See application file for complete search history.

(56) References Cited

U.S. PATENT DOCUMENTS

2001/0020946 A1*   9/2001   Kawakami et al. ......... 345/582

FOREIGN PATENT DOCUMENTS

| JP | 10-154149 | 6/1998 |
|----|-----------|--------|
| JP | 2002-41530 | 2/2002 |

* cited by examiner

*Primary Examiner*—Etienne P. LeRoux
(74) *Attorney, Agent, or Firm*—Scully, Scott, Murphy & Presser, P.C.

(57) ABSTRACT

A three-dimensional model search method includes a step of producing a plurality of two-dimensional images obtained by observing a three-dimensional model as an object of search from points of view different from one another. In a first value extraction step, the respective feature values of the two-dimensional images are extracted from the plurality of two-dimensional images. In a search key input step, a two-dimensional image as a search key is inputted. In a second extraction step, the feature value is extracted from the two-dimensional image as the search key. In a similarity search step, the feature values extracted in the first and second extraction steps are used to carry out similarity search, and a three-dimensional model which is similar to the search key is outputted.

9 Claims, 7 Drawing Sheets

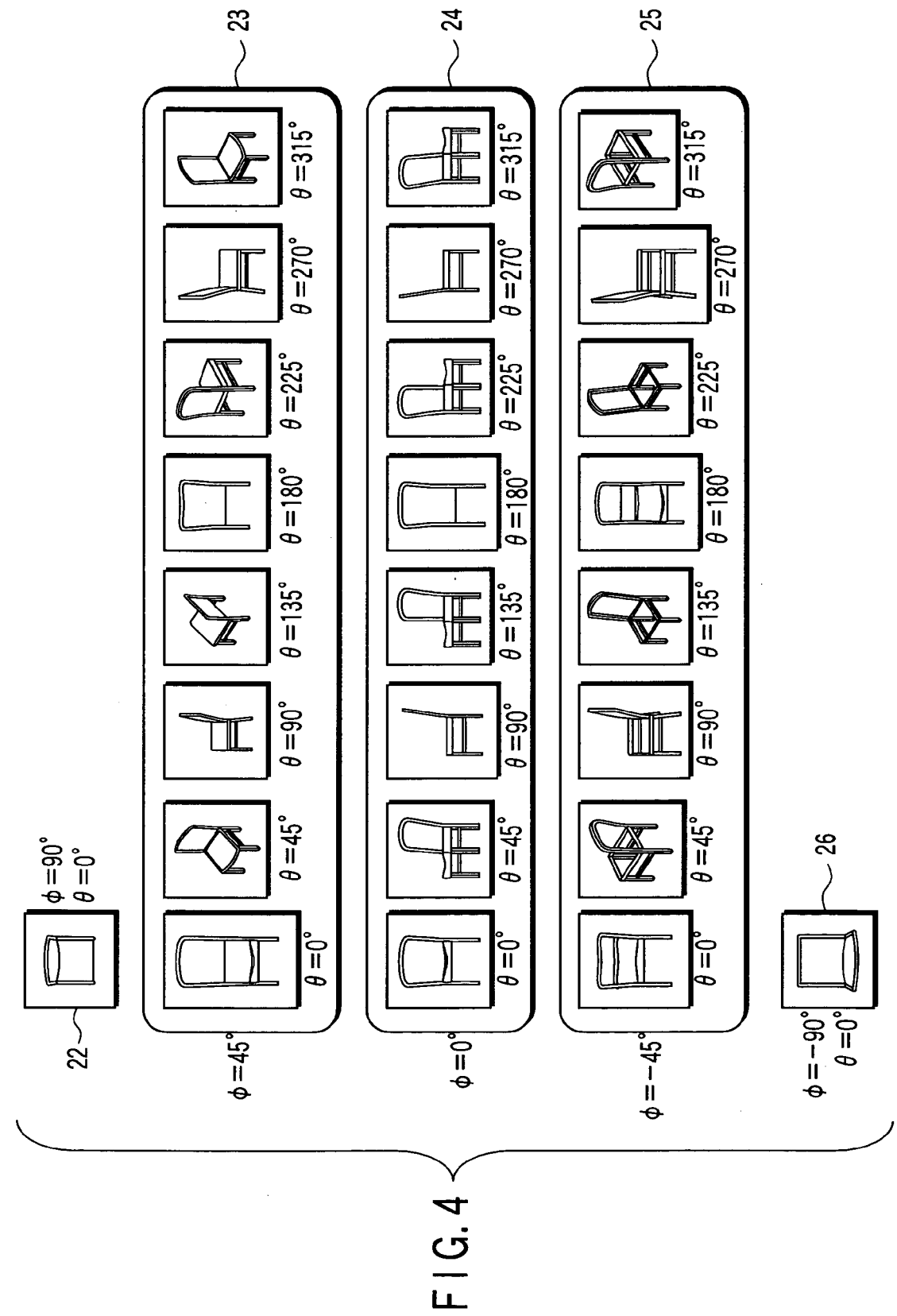
F I G. 4

SIMILARITY SEARCH OF THREE-DIMENSIONAL MODEL USING TWO-DIMENSIONAL IMAGE AS SEARCH KEY

CROSS-REFERENCE TO RELATED APPLICATIONS

This application is based upon and claims the benefit of priority from the prior Japanese Patent Application No. 2002-332177, filed Nov. 15, 2002, the entire contents of which are incorporated herein by reference.

BACKGROUND OF THE INVENTION

1. Field of the Invention

The present invention relates to a three-dimensional model search method, three-dimensional model search apparatus, three-dimensional model search program, and three-dimensional model search system.

2. Description of the Related Art

In recent years, a static image which is digital data, and multimedia object data such as a movie, sound, and music have been used in various scenes.

For example, even with respect to data representing a three-dimensional object, in addition to CAD data which has heretofore been used, three-dimensional object data of merchandise, digital archive by the three-dimensional object data of archeological estates and art objects, and the like have actively been used.

These data are steadily increasing, and there has been a rising demand for efficient management of the data or for efficient search for the data required by a user.

To meet this demand, various techniques have been proposed. Even concerning a technique of searching for similar objects, a number of methods for calculating characteristics possessed by multimedia objects as feature values represented by numeric values to use multi-dimensional vectors constituted of these feature values have been proposed.

In searching for the similar object by the feature value, a subjectively close object is designated in the object desired as a search result by the user, and the feature value of this object is compared with that of the object registered in the database, so that the similar object can be searched.

For example, in "similar object search method and apparatus" described in Jpn. Pat. Appln. KOKAI Publication No. 10-154149, a method and apparatus for outputting an object similar to an inputted reference object have been proposed.

Moreover, in "search method of three-dimensional body database and recording medium in which search program of three-dimensional body database is recorded" described in Jpn. Pat. Appln. KOKAI Publication No. 2002-41530, there has been proposed a search method based on similarity between an inputted three-dimensional body and a three-dimensional body stored in a database.

BRIEF SUMMARY OF THE INVENTION

According to a first aspect of the present invention, there is provided a method of using a feature value of a three-dimensional model to search for a similar three-dimensional model, comprising: a search object image production step of producing a plurality of two-dimensional images obtained by observing the three-dimensional model as an object of search from points of view different from one another; a first feature value extraction (calculation) step of extracting (calculating) the respective feature values of the two-dimensional images from the plurality of two-dimensional images produced in the search object image production step; a search key input step of inputting a two-dimensional image as a search key; a second feature value extraction (calculation) step of extracting (calculating) the feature value from the two-dimensional image as the search key inputted in the search key input step; and a similarity search step of using the feature values extracted (calculated) in the first and second feature value extraction (calculation) steps to carry out similarity search, and outputting a three-dimensional model which is similar to the search key.

The two-dimensional image produced in the search object image production step is preferably a two-dimensional projection image and/or a sectional image which corresponds to the three-dimensional model.

The two-dimensional projection image and/or the sectional image preferably includes texture information.

The three-dimensional model search method according to the first aspect preferably further comprises: a storage step of storing the three-dimensional model as the object of the search, the feature value extracted in the first feature value extraction step, and correspondence information indicating correspondence between the three-dimensional model and the feature value extracted in the first feature value extraction step.

Moreover, the three-dimensional model search method according to the first aspect preferably further comprises: a three-dimensional feature value extraction step of extracting a three-dimensional feature value from the three-dimensional model as the object of the search; and a second similarity search step of using the three-dimensional feature value of the three-dimensional model outputted as a search result of the similarity search step as a search key to search the three-dimensional feature value of each three-dimensional model extracted in the three-dimensional feature value extraction step, and outputting a three-dimensional model which has the three-dimensional feature value similar to the search key.

According to a second aspect of the present invention, there is provided a three-dimensional model search apparatus which uses a feature value of a three-dimensional model to search for a similar three-dimensional model, comprising: a search object image production section which produces a plurality of two-dimensional images obtained by observing the three-dimensional model as an object of search from points of view different from one another; a first feature value extraction section which extracts the respective feature values of the two-dimensional images from the plurality of two-dimensional images produced by the search object image production section; a search key input section which inputs the two-dimensional image as a search key; a second feature value extraction section which extracts the feature value from the two-dimensional image as the search key inputted via the search key input section; and a similarity search section which uses the feature values extracted by the first and second feature value extraction sections to carry out similarity search and which outputs the three-dimensional model similar to the search key.

The two-dimensional image produced in the search object image production section is preferably a two-dimensional projection image and/or a sectional image which corresponds to the three-dimensional model.

The two-dimensional projection image and/or the sectional image preferably includes texture information.

The three-dimensional model search apparatus according to the second aspect preferably further comprises: a storage section which stores the three-dimensional model as the object of the search, the feature value extracted in the first feature value extraction section, and correspondence information indicating correspondence between the three-dimensional model and the feature value extracted in the first feature value extraction section.

Moreover, the three-dimensional model search apparatus according to the second aspect preferably further comprises: a three-dimensional feature value extraction section which extracts a three-dimensional feature value from the three-dimensional model as the object of the search; and a second similarity search section which uses the three-dimensional feature value of the three-dimensional model outputted as a search result in the similarity search section as a search key to search the three-dimensional feature value of each three-dimensional model extracted in the three-dimensional feature value extraction section and which outputs the three-dimensional model having the three-dimensional feature value similar to the search key.

Moreover, according to a third aspect of the present invention, when allowing a computer to calculate a feature value of a three-dimensional model and to search for a similar three-dimensional model using the feature value, there are realized: a search object image production function of producing a plurality of two-dimensional images obtained by observing the three-dimensional model as an object of search from points of view different from one another; a first feature value extraction function of extracting the respective feature values of the two-dimensional images from the plurality of two-dimensional images produced by the search object image production function; a search key input function of inputting a two-dimensional image as a search key; a second feature value extraction function of extracting the feature value from the two-dimensional image as the search key inputted by the search key input function; and a similarity search function of using the feature values extracted by the first and second feature value extraction functions to carry out similarity search, and outputting a three-dimensional model similar to the search key.

Moreover, according to a fourth aspect of the present invention, there is provided a three-dimensional model search system which calculates a feature value of a three-dimensional model and uses this feature value to search for a similar three-dimensional model, comprising: a first feature value extraction section which extracts the respective feature values of two-dimensional images from a plurality of two-dimensional images obtained by observing the three-dimensional model as an object of search from points view different from one another; a second feature value extraction section which receives a two-dimensional image as a search key transmitted from a client via a network to extract a feature value of the two-dimensional image; and a similarity search section which uses the feature values extracted in the first and second feature value extraction sections to carry out similarity search and which transmits information about a three-dimensional model similar to the search key to the client via the network.

Furthermore, according to a fifth aspect of the present invention, there is provided a three-dimensional model search apparatus which uses a feature value of a three-dimensional model to search for a similar three-dimensional model, comprising: search object image production means for producing a plurality of two-dimensional images obtained by observing the three-dimensional model as an object of search from points of view different from one another; first feature value extraction means for extracting the respective feature values of the two-dimensional images from the plurality of two-dimensional images produced by the search object image production means; search key input means for inputting a two-dimensional image as a search key; second feature value extraction means for extracting the feature value from the two-dimensional image as the search key inputted by the search key input means; and similarity search means for using the feature values extracted by the first and second feature value extraction means to carry out similarity search, and outputting a three-dimensional model which is similar to the search key.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a diagram showing two-dimensional projection images 22 to 26 produced by processing in step S105;

DETAILED DESCRIPTION OF THE INVENTION

[First Embodiment]
(Constitution)

Figure 1:
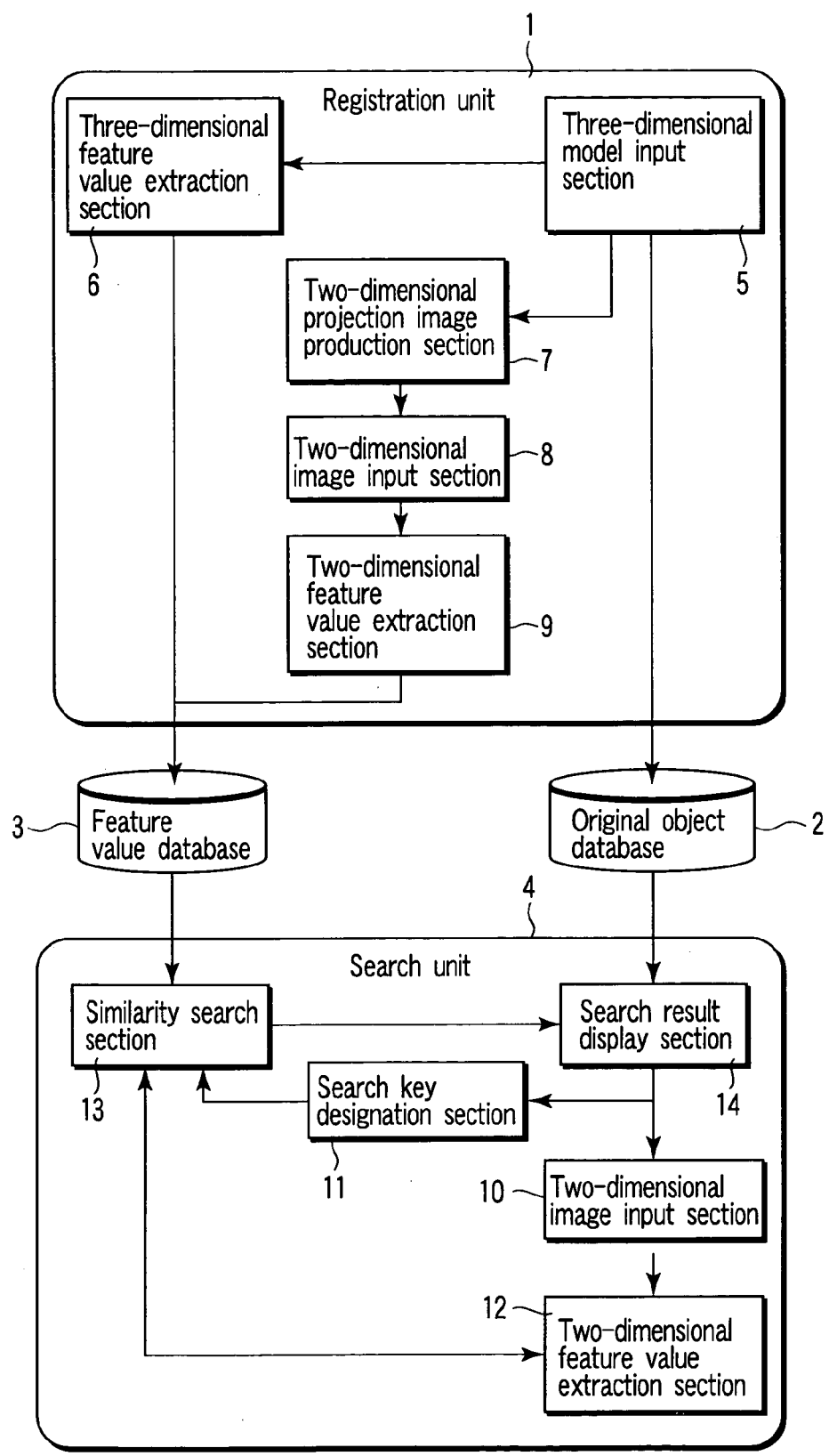
FIG. 1 is a diagram showing a constitution of a three-dimensional interior item similarity search system according to a first embodiment of the present invention.

FIG. 1 is a diagram showing a constitution of a three-dimensional interior item similarity search system according to a first embodiment of the present invention. The system includes a registration unit 1 and search unit 4. The registration unit 1 is connected to the search unit 4 via an original object database 2 and feature value database 3. Three-dimensional shape data of interior goods such as a chair and table and attribute data such as a name are registered in the original object database 2. A feature value of a three-dimensional model registered in the original object database 2 is registered in the feature value database 3. It is to be noted that the registered feature value is normalized in accordance with a scale of each feature value. Link information to the three-dimensional model from which the feature value has been extracted (calculated) is also registered.

The registration unit 1 includes a three-dimensional feature value extraction (calculation) section 6, a three-dimensional model input section 5, a two-dimensional projection image production section 7, a two-dimensional image input section 8, and a two-dimensional feature value extraction (calculation) section 9. The three-dimensional model input section 5 is connected to the three-dimensional feature value extraction section 6, two-dimensional projection image production section 7, and original object database 2. The three-dimensional feature value extraction section 6 is connected to the feature value database 3. The two-dimensional projection image production section 7 is connected to the two-dimensional image input section 8. The two-dimensional image input section 8 is connected to the two-dimensional feature value extraction section 9. The two-dimensional feature value extraction section 9 is connected to the feature value database 3.

Moreover, the search unit 4 includes a similarity search section 13, a search result display section 14, a search key designation section 11, a two-dimensional image input section 10, and a two-dimensional feature value extraction section 12. The two-dimensional image input section 10 is connected to the search key designation section 11, search result display section 14, and two-dimensional feature value extraction section 12. The search key designation section 11 and two-dimensional feature value extraction section 12 are connected to the similarity search section 13. The similarity search section 13 is connected to the feature value database 3 and search result display section 14. The search result display section 14 is connected to the search key designation section 11 and original object database 2.

It is to be noted that the two-dimensional image input section 8 and two-dimensional image input section 10 are the same function block. Moreover, the two-dimensional feature value extraction section 9 and two-dimensional feature value extraction section 12 are the same function block.

Function

Next, a function of the above-described three-dimensional interior item similarity search system. First, an operation procedure in the registration unit 1 will be described with reference to FIG. 2. In step S101, a user inputs three-dimensional model data 102 to be registered. The step S101 is processed in the three-dimensional model input section 5 of FIG. 1. This three-dimensional model is data on a computer, such as data prepared by CAD and data taken in by a three-dimensional scanner.

In step S103, the three-dimensional model data 102 inputted in the step S101 is registered in the original object database 2 of FIG. 1. In step S104, the feature value which is three-dimensional data is extracted from the three-dimensional model data 102 inputted in the step S101. The step S104 is processed in the three-dimensional feature value extraction section 6 of FIG. 1. As the feature value, a histogram obtained by quantizing values for each color information, which can be calculated with respect to texture of a three-dimensional object, such as RGB, HSV, and Lab, a shape histogram obtained by quantizing edge differentials, a histogram of volume, surface area, vertex distribution, and polygon distribution, and the like are used. These feature values are taken out from various portions, and may also be used as separate feature values.

Figure 3:
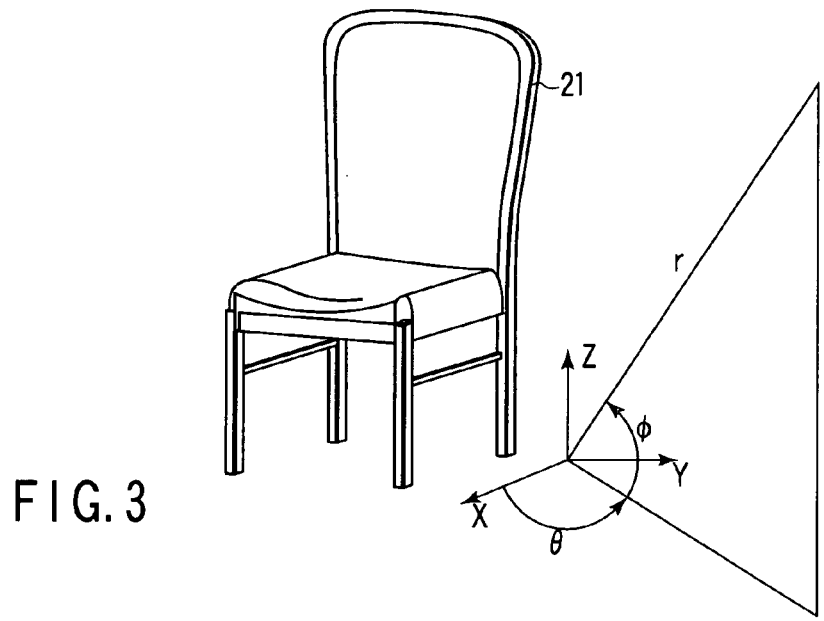
FIG. 3 is a diagram showing one example of inputted three-dimensional model data 102.

In step S105, the two-dimensional projection image is produced from the three-dimensional model data 102 inputted in the step S101. The step S105 is processed in the two-dimensional projection image production section 7 of FIG. 1. Here, one example of the inputted three-dimensional model data 102 is assumed to be a chair 21 of FIG. 3, and a plurality of two-dimensional images are produced in which the three-dimensional model data 102 is observed from points of view different from one another. In FIG. 3, θ is an angle on an X-Y plane, and φ is an angle on a Y-Z plane. By the processing in the step S105, two-dimensional projection images 22 to 26 shown in FIG. 4 are produced from the chair 21.

In FIG. 4, the two-dimensional projection image 22 indicates a case where φ=90°, θ=0° in FIG. 3. Functions provided as three-dimensional libraries such as Open GL and Direct X are used to render the chair 21 which is the three-dimensional model from a point of view of φ=90°, θ=0°, and accordingly the two-dimensional projection image 22 is obtained.

By similar procedure, the two-dimensional projection image 23 is obtained as a rendered image in a case of φ=45°, θ=0, 45, 90, 135, 180, 225, 270, 315°.

Moreover, by the similar procedure, the two-dimensional projection image 24 is obtained as the rendered image in a case of θ=0°, η=0, 45, 90, 135, 180, 225, 270, 315°.

Furthermore, by the similar procedure, the two-dimensional projection image 25 is obtained as the rendered image in a case of φ=−45°, θ=0, 45, 90, 135, 180, 225, 270, 315°.

Additionally, by the similar procedure, the two-dimensional projection image 26 is obtained as the rendered image in a case of φ=−90°, 74 =0°.

In step S106, the two-dimensional projection image produced in the step S105 is received as input data. The step S106 is processed in the two-dimensional image input section 8 of FIG. 1.

In step S108, a two-dimensional feature value is extracted from the two-dimensional image inputted in the step S106. The step S108 is processed in the two-dimensional feature value extraction section 9 of FIG. 1. As the feature value, the histogram obtained by quantizing the values for each color information, which can be calculated with respect to the two-dimensional image, such as RGB, HSV, and Lab, the shape histogram obtained by quantizing the edge differentials, and the like are used. These feature values are taken out over the various portions, and may also be used as the separate feature values.

In step S109, the three-dimensional feature value extracted in the step S104 and the two-dimensional feature value extracted in the step S108 are registered in the feature value database 3 of FIG. 1. It is to be noted that, in this case, the link information into the three-dimensional model data 102 which is the object is also registered.

Next, the operation procedure in the original object database 2 will be described with reference to FIG. 5. In step S201, a user inputs an interior item considered to be searched as two-dimensional image data 211. The step S201 is processed in the two-dimensional image input section 10 of FIG. 1. The two-dimensional image data 211 inputted in the step S201 is prepared using an illustration input function provided by the two-dimensional image input section 10 with a mouse, pen, tablet, and the like by the user. A plurality of two-dimensional image data 211 may also be inputted.

In step S202, the user designates the two-dimensional image or the three-dimensional model which is the search key. The step S202 is processed in the search key designation section 11 of FIG. 1. In a first search, since only the two-dimensional image is inputted, the search key designated in step S203 constitutes the two-dimensional image data 211 inputted in the step S201.

It is judged in step S203 whether or not the three-dimensional image is included in the search key. The step S203 is processed in the similarity search section 13 of FIG. 1. In the first search, since only the two-dimensional image constitutes the search key, the processing advances to the step S204 from the step S203.

In step S204, the two-dimensional feature value is extracted from the two-dimensional image as the search key designated in the step S202. The step S204 is processed in the two-dimensional feature value extraction section 12 of FIG. 1. An extraction process of the two-dimensional feature value in step S204 is the same as that performed in the step S108 of FIG. 2.

In step S205, only the two-dimensional feature value is read from the feature values registered in the feature value database 3 of FIG. 1. The step S205 is processed in the similarity search section 13 of FIG. 1.

In step S206, the feature value corresponding to the search key designated in the step S202 is used as a basis to calculate similarity of the feature value read in the step S205 or S210. The step S206 is processed in the similarity search section 13 of FIG. 1.

For a method of calculating the similarity, various methods have been proposed such as a method based on Euclidean distance in a n-dimensional space constituted of a difference of each feature value, a method using an index obtained by indexation of the Euclidean distance, and a method based on Mahalanobis distance.

In the present embodiment, the method of calculating similarity is based on the Euclidean distance in the n-dimensional space constituted of the difference of each feature value. When the Euclidean distance is smaller, the similarity is higher.

The first search corresponds to a process flow via the step S205. Therefore, the process of the similarity search using the two-dimensional image feature value as the object will be described.

It is to be noted that two two-dimensional images as the search key designated in the step S202 are assumed. It is assumed that the respective images are p1, p2, and the two-dimensional feature values extracted from these images are fp1, fp2. Here, assuming that an item number of the two-dimensional feature value is n, fp1, fp2 denote n-dimensional vectors.

It is assumed that 26 k two-dimensional feature values fqji (i=1, ..., k: j=1, ..., 26) are read in the step S205. An affixed character i indicates the registered three-dimensional model, and j indicates each two-dimensional projection image produced from one three-dimensional model.

It is to be noted that fqji denotes the n-dimensional vector in the same manner as in the two-dimensional feature values fp1, fp2 as the search key.

It is assumed that the Euclidean distance calculated from fqji and fp1 is dp1ji (i=1, ..., k: j=1, ..., 26) and that the Euclidean distance calculated from fqji and fp2 is dp2ji (i=1, ..., k: j=1, ..., 26).

The Euclidean distance is calculated as a square sum of the differences of the respective elements of the n-dimensional vector.

The Euclidean distance from fp1 corresponding to the registered three-dimensional model i is dp1ji (j=1, ..., 26), and there are 26 numeric values. With the similarity search by the two-dimensional feature value, a smallest distance in 26 Euclidean distances is assumed to be the similarity of the three-dimensional model i. In the present embodiment, when j=a, dp1ji is minimized.

Similarly, it is assumed that the minimum Euclidean distance between the three-dimensional model i and fp2 is obtained at the time of j=b. With the similarity search by the two-dimensional feature value, a minimum distance in Euclidean distances dp1ai, dp2bi of the three-dimensional model i with respect to each search key indicates a final similarity of the three-dimensional model i.

In step S206, the three-dimensional model i (i=1, ..., k) is finally rearranged in order of similarity.

In step S207, results of the similarity search processed in the step S206 are displayed on a screen in order from a highest similarity. The step S207 is processed in the search result display section 14 of FIG. 1.

In step S208, it is judged whether or not the search key is added from the search results. The step S208 is processed in the search result display section 14 of FIG. 1.

When the search key is not added, the process ends. When the search key is added, in step S209, the user selects one or more models closer to the item considered to be searched from the three-dimensional models displayed as the search results. The three-dimensional model selected in the step S209 is designated as the search key in the step S202, and the similarity search process is carried out again.

When the three-dimensional model is designated as the search key, the process advances to the step S210 from judgment in the step S203.

In the step S210, only the three-dimensional feature value is read among the registered feature values from the feature value database 3 of FIG. 1. Since the three-dimensional feature value corresponding to the two-dimensional image designated at the time of the first search does not exist, the process with respect to the two-dimensional image is omitted. The step S210 is processed in the similarity search section 13 of FIG. 1.

The process in the subsequent step S206 corresponds to the similarity search using the three-dimensional feature value, different from the above-described first search.

It is assumed that two three-dimensional models are selected in step S209 to constitute the search key designated in the step S202. It is assumed that the respective three-dimensional models are t1, t2, and the three-dimensional feature values extracted from these models are ft1, ft2. Here, assuming that the item number of the three-dimensional feature value is m, ft1, ft2 denote a m-dimensional vector.

It is assumed that k three-dimensional feature values fui (i=1, ..., k) are read in step S210. It is to be noted that fui denotes the m-dimensional vector in the same manner as in the three-dimensional feature values ft1, ft2 as the search key.

It is assumed that the Euclidean distances calculated from fui and ft1 are dt1i (i=1, ..., k) and that the Euclidean distances calculated from fui and ft2 are dt2i (i=1, ..., k).

The Euclidean distances are calculated as the square sum of the differences of the respective elements of the m-dimensional vector.

With the similarity search by the three-dimensional feature values, a product of the minimum Euclidean distances dt1i, dt2i with respect to the respective search keys of the three-dimensional model i is the final similarity of the three-dimensional model i.

(Effect)

Next, some effects of the first embodiment will be described.

In the registration unit 1, a plurality of two-dimensional projection images are automatically produced from the three-dimensional model in the step S105, and the feature values are extracted from these two-dimensional projection images in the step S108. Accordingly, in the search unit 4, the similarity search is possible between the two-dimensional image inputted in the step S201 and the two-dimensional projection image produced in the step S105.

Since the two-dimensional projection image produced in the step S105 is associated with the original three-dimensional model by the database, the original three-dimensional model can be designated from an arbitrary two-dimensional projection image.

That is, according to the present embodiment, the two-dimensional image is used as the search key and the similarity search is possible with respect to the three-dimensional model.

Since the two-dimensional image can be designated as the search key, it is not necessary to browse a large amount of three-dimensional models registered in the database or to look for the item considered to be searched.

As a result, the user can search for the three-dimensional model with simpler means.

In the step S105, a plurality of two-dimensional projection images are automatically produced from the three-dimensional model.

When the three-dimensional model is two-dimensionally projected, for example, as in the projection images 22 to 26 of FIG. 3, the projection image obtained from the same three-dimensional model 21 differs largely in accordance with points of view.

Therefore, even when only one projection image is produced from the three-dimensional model 21, a possibility of similarity to the two-dimensional image inputted by the user in the step S201 is low.

In the present embodiment, the projection image from the position of a point of view 26 is produced so as to surround the three-dimensional model.

As a result, when the user inputs the illustration of the item to be searched, the similarity search for the three-dimensional model can easily be carried out from the two-dimensional image without worrying about the point of view in which the illustration is drawn with respect to the three-dimensional model.

In the step S206, with the similarity search by the two-dimensional feature value, the minimum distance is selected as the similarity between the three-dimensional model and the search key from the Euclidean distances between a plurality of two-dimensional projection images corresponding to the same three-dimensional model and the search key.

As a result, when the two-dimensional image inputted by the user is similar to any of the two-dimensional projection images produced from the three-dimensional model, the three-dimensional model similar to the inputted two-dimensional image can be searched without being influenced by the non-similar two-dimensional projection image.

In step S209, the model to be added as the search key can be selected from the three-dimensional models displayed as the search results.

As a result, in this and subsequent similarity searches, a process of calculating the similarity between the three-dimensional models is carried out, and the similarity search can be carried out with a higher precision as compared with the similarity search using the two-dimensional image as the key.

It is to be noted that the point of view in producing the two-dimensional projection image is not limited to the combination of the angles described in the step S105.

The point of view may also be rotated around r-axis of FIG. 3.

Moreover, in the step S106, two-dimensional image 107 of the three-dimensional model separately prepared by the user may also be received as input data.

In this case, in the step S206, the number of two-dimensional projection images corresponding to the three-dimensional model increases to 27, but any change does not occur in the processing method.

Furthermore, a method of inputting the image in the step S201 may also be a method of reading a separately prepared image file.

The separately prepared image file may also be prepared by an illustration preparation application, or may also be an image photographed with a digital camera or video.

Additionally, the search object is not limited to the interior item, and includes any three-dimensional model.

The feature value data registered in the feature value database 3 is not limited to a normalized mode, and may also be a mode dynamically normalized at the time of execution of the similarity search.

[Second Embodiment]

(Constitution)

Figure 6:
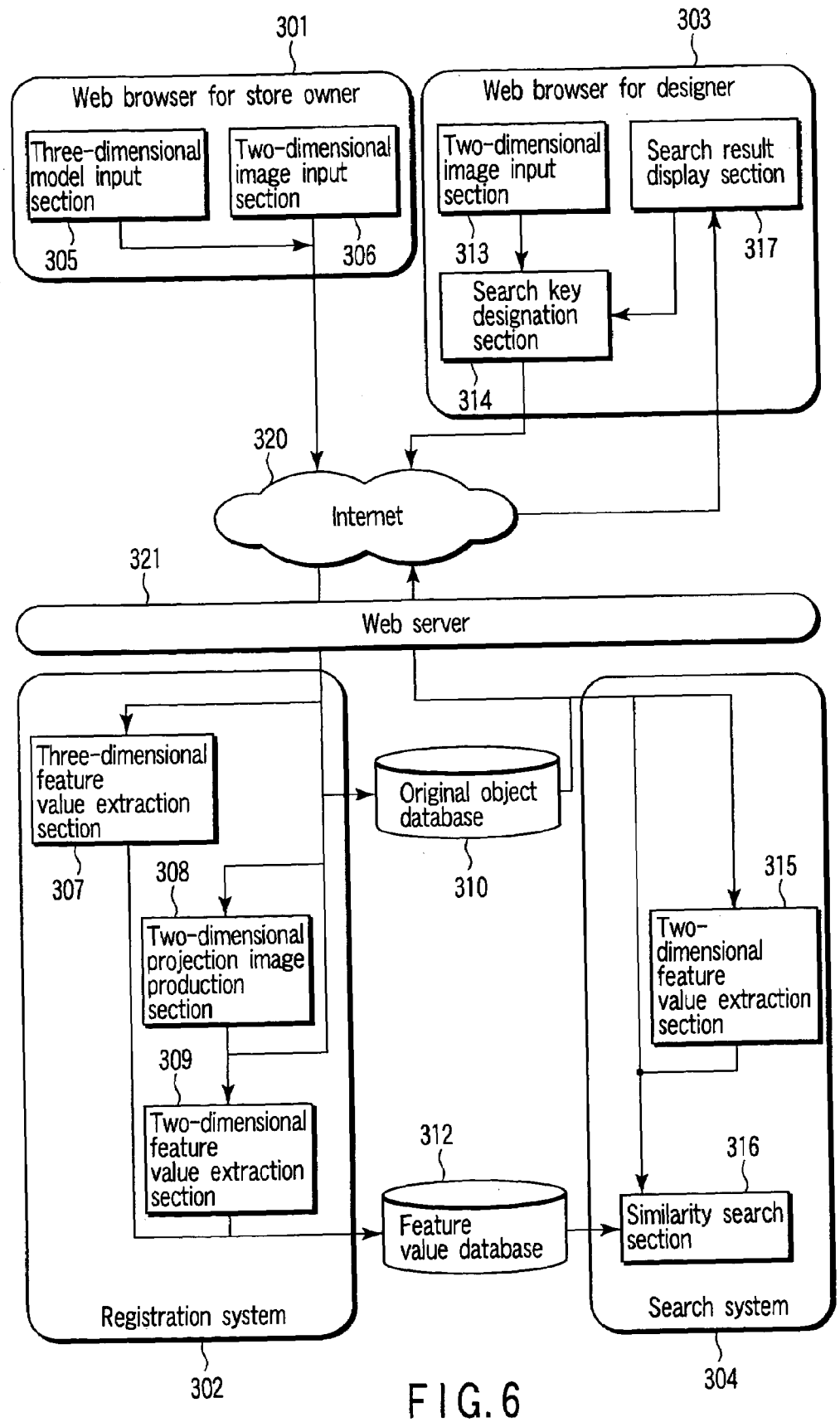
FIG. 6 is a diagram showing a constitution of the three-dimensional interior item similarity search system according to a second embodiment of the present invention.

FIG. 6 is a diagram showing the constitution of the three-dimensional interior item similarity search system according to a second embodiment of the present invention. The system includes a registration system 302 and search system 304. The registration system 302 is connected to the search system 304 via an original object database 310 and feature value database 312. The three-dimensional shape data of the interior goods such as the chair and table and the attribute data such as the name are registered in the original object database 310. The feature value of the three-dimensional model registered in the original object database 310 is registered in the feature value database 312. It is to be noted that the registered feature value is normalized in accordance with the scale of each feature value. The link information into the three-dimensional model from which the feature value has been extracted is also registered.

The registration system 302 includes a three-dimensional feature value extraction section 307, a two-dimensional projection image production section 308, and a two-dimensional feature value extraction section 309. The three-dimensional feature value extraction section 307 is connected to the feature value database 312. The two-dimensional projection image production section 308 is connected to the two-dimensional feature value extraction section 309. The two-dimensional feature value extraction section 309 is connected to the feature value database 312. Furthermore, the three-dimensional feature value extraction section 307, two-dimensional projection image production section 308, and two-dimensional feature value extraction section 309 are connected to the original object database 310.

Moreover, the search system 304 includes a two-dimensional feature value extraction section 315 and a similarity search section 316. The two-dimensional feature value extraction section 315 is connected to the similarity search section 316. The similarity search section 316 is connected to the feature value database 312. The two-dimensional feature value extraction section 315 and similarity search section 316 are connected to the original object database 310.

The registration system 302 and search system 304 share the original object database 310 and feature value database 312.

The registration system 302 and search system 304 are each constitute of one or a plurality of units of hardware by distributed network techniques such as Java2 EE.

It is to be noted that the registration system 302 and search system 304 in the present embodiment are web applications and input/output information via a web server 321.

Furthermore, the registration system 302 is connected to a web browser 301 for a web store owner as a client who registers merchandise as a search item via the web server 321 and an internet 320. The search system 304 is connected to a web browser 303 for a designer as a client who searches for the item via the web server 321 and internet 320.

The browser for the web store owner 301 includes: a three-dimensional model input section 305 which realizes a user interface for inputting the three-dimensional model data of the merchandise to be registered; and a two-dimensional image input section 306 which realizes a user interface for inputting thumbnail image data for use in displaying the merchandise to be registered as the two-dimensional image.

On the other hand, the web browser for the designer 303 includes: a two-dimensional image input section 313 which realizes a user interface for inputting the two-dimensional image of the item to be searched; a search key designation section 314 which realizes a user interface for designating the inputted two-dimensional image or a part of the item displayed as the search result as the search key; and a search result display section 317 which displays the search result transmitted from the search system 304.

(Function)

Next, the function of the above-described three-dimensional interior item similarity search system will be described. Since the process flow in registering the merchandise of the store by the web store owner is substantially the same as the content described with reference to FIG. 2 in the first embodiment, only differences will be described in the present embodiment.

The step S101 is processed in the three-dimensional model input section 305. The step S104 is processed in the three-dimensional feature value extraction section 307. The step S105 is processed in the two-dimensional projection image production section 308. The step S106 is processed in the two-dimensional image input section 306. The step S108 is processed in the two-dimensional feature value extraction section 309.

In the step S106 in the present embodiment, the web store owner inputs two-dimensional image data 107 obtained by photographing the merchandise to be registered. This two-dimensional image data 107 is obtained by photographing the merchandise with the digital camera, and the like. The inputted two-dimensional image data 107 is transmitted to the two-dimensional feature value extraction section 309 of the registration system 302 via the internet 320.

In the step S108 in the present embodiment, in addition to the two-dimensional projection image produced in the step S105 using the three-dimensional model data inputted in the step S101, also from the two-dimensional image inputted in the step S107, the two-dimensional image feature values are extracted.

Since the process flow in which the designer uses the search system 304 to search the registered interior items is substantially the same as the content described with reference to FIG. 4 in the first embodiment, only the differences will be described in the present embodiment. The step S201 is processed in the two-dimensional image input section 313. The step S202 is processed in the search key designation section 314. The steps S203, S205, S206, and S210 are processed in the similarity search section 316. The step S204 is processed in the two-dimensional feature value extraction section 315. The steps S207 and S209 are processed in the search result display section 317.

The two-dimensional image input section 313 which processes the step S201 in the present embodiment does not have a function for the designer to draw the illustration. In the step S201, the designer inputs the image photographed with the digital camera, and the like or the illustration drawn in another application as the file.

The similarity calculation process carried out in the steps S204, S205, S210, and S206 is carried out in the same manner as in the first embodiment.

The result of the similarity search performed in the step S206 is displayed in the search result display section 317 of the web browser for the designer 303 via the internet.

(Effect)

Next, the effect of the embodiment of the present invention will be described.

In the registration system 302, a plurality of two-dimensional projection images are automatically produced from the three-dimensional model in the step S105, and the feature values are extracted from these two-dimensional projection images in the step S108. Accordingly, in the search system 304, the similarity search is possible between the two-dimensional image data 211 inputted in the step S201 and the two-dimensional projection image produced in the step S105.

Since the two-dimensional projection image produced in the step S105 is associated with the original three-dimensional model by the database, the original three-dimensional model can be designated from an arbitrary two-dimensional projection image.

That is, according to the present embodiment, the two-dimensional image is used as the search key and the similarity search is possible with respect to the three-dimensional model.

Since the two-dimensional image can be designated as the search key, it is not necessary to browse a large amount of three-dimensional models registered in the database or to look for the item considered to be searched. For example, the item considered to be searched is photographed with the digital camera, and the like, and it can be searched/judged whether or not another similar item has been registered.

As a result, the user can search for the three-dimensional model registered in the system on the internet with simpler means.

In the step S209, the model to be added as the search key can be selected from the three-dimensional models displayed as the search results.

As a result, in this and subsequent similarity searches, the process of calculating the similarity between the three-dimensional models is carried out, and the similarity search can be carried out with the higher precision as compared with the similarity search using the two-dimensional image as the key.

It is to be noted that the system of FIG. 6 may also be connected inside LAN or the same hardware not via the internet.

Moreover, the search object is not limited to the interior item, and includes any three-dimensional model.

The feature value data registered in the feature value database 312 is not limited to the normalized mode, and may also be the mode dynamically normalized at the time of the execution of the similarity search.

Moreover, the item to be registered is not limited to the three-dimensional model including a three-dimensional structure, and may also be a pseudo three-dimensional model, for example, represented by Quick Time VR, in which the two-dimensional images are three-dimensionally arranged.

In this case, the process performed in the three-dimensional feature value extraction section 307 of FIG. 6 is similar to that performed by the two-dimensional feature value extraction section 309 with respect to the arranged two-dimensional images.

The feature value extracted in this manner is handled as the three-dimensional feature value in the feature value database.

[Third Embodiment]

(Constitution)

A third embodiment of the present invention relates to a CT/MRI diagnosis apparatus constituted as shown in the block diagram of FIG. 1.

Here, only the differences from the first embodiment will be described. In the original object database 2, CT/MRI three-dimensional data including a tumor of a head photographed in the past and patient's medical record are registered as case data.

The CT/MRI three-dimensional data registered in the original object database 2 is the three-dimensional data photographed with 3D CT and/or 3D MRI.

The feature value of head three-dimensional data registered in the original object database 2 is registered in the feature value database 3.

Moreover, the link information into the case data registered in the original object database 2 is also registered in the feature value database 3.

In the present embodiment, the two-dimensional projection image production section 7 has a function of producing a two-dimensional sectional image of the three-dimensional model.

The two-dimensional image input section 10 has a function of setting a region of interest in the present embodiment.

The function of setting a region of interest in the present embodiment is a function of setting a region of interest with respect to a slice image of CT/MRI to cut the region.

The user can designate a range of the region of interest using input devices such as a mouse.

Moreover, after setting a threshold value of a pixel value to clarify a specific region, the value of the region may also be designated.

It is to be noted that the region of interest is an inner tissue as landmarks such as tumors, eyeballs, and optic nerves.

Function

Next, the function of the above-described CT/MRI diagnosis apparatus will be described. First, the operation procedure in the registration unit 1 will be described with reference to FIG. 2.

In the step S101, the photographed CT/MRI three-dimensional model data 102 is inputted.

In the step S104, the feature value is extracted as the three-dimensional feature value data from the CT/MRI three-dimensional model data 102 inputted in the step S101. As the feature value, a histogram obtained by quantizing gray values which can be calculated from a sectional texture of the three-dimensional data, a shape histogram obtained by quantizing the edge differentials, the volume and surface area of the three-dimensional object, position of the tumor, and the like are used. These feature values are taken out from the whole head which is an object, and may also be extracted from a limited specific portion such as the tumor.

In the step S105, the two-dimensional projection image and sectional image are produced from the CT/MRI three-dimensional model data 102 inputted in the step S101.

Figure 7:
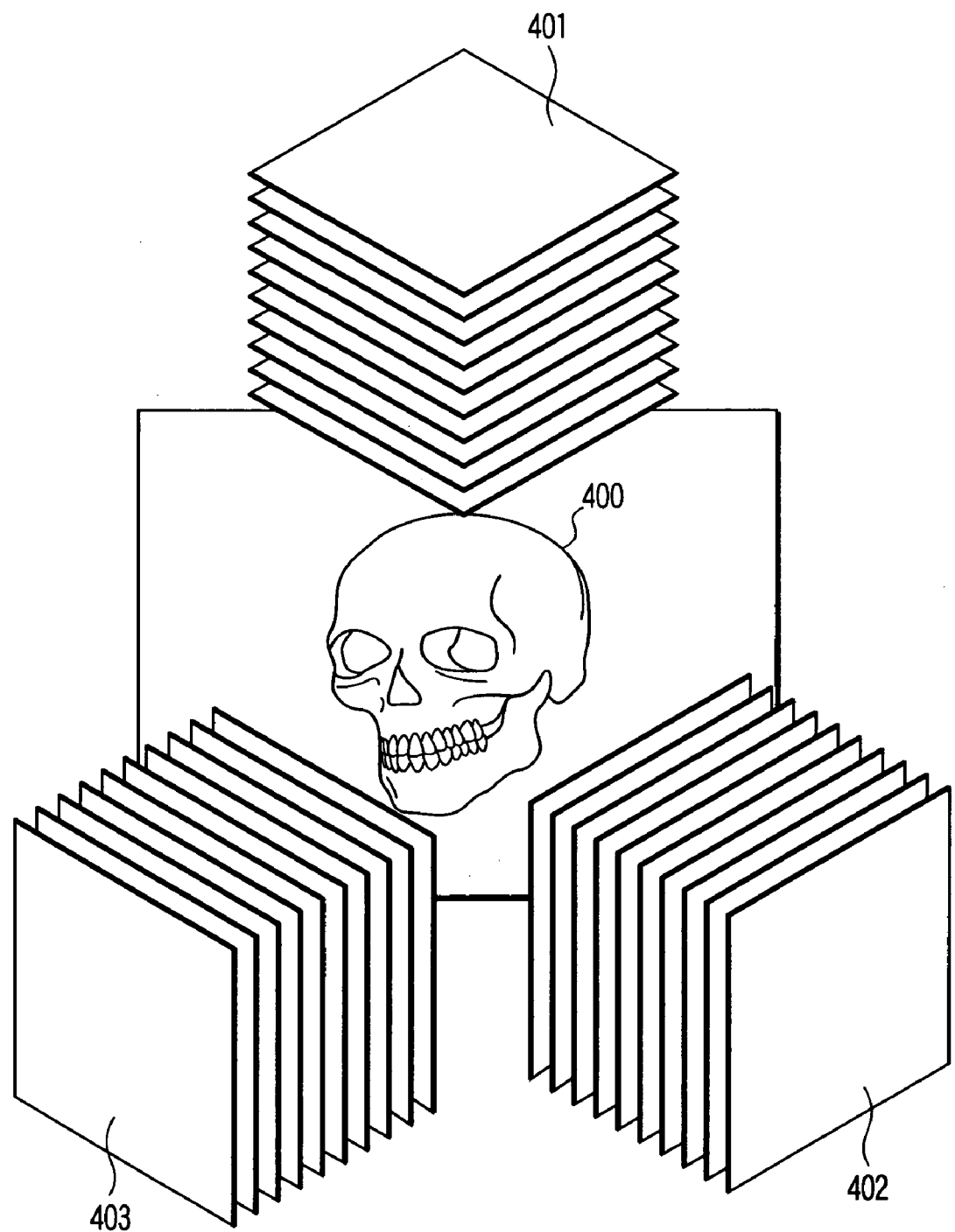
FIG. 7 is a diagram showing head three-dimensional CT data 400 which is one example of inputted CT/MRI three-dimensional model data 102 in a third embodiment of the present invention.

FIG. 7 shows head three-dimensional CT data 400 which is one example of inputted CT/MRI three-dimensional model data 102. In the step S105, the projection image is produced from the head three-dimensional CT data 400 in the same manner as in the first embodiment. Further in the step S105, a sectional view 401 of an axial direction, a sectional view 402 of a sagittal direction, and a sectional view 403 of a coronal direction are produced from the head three-dimensional CT data 400.

Figure 8A:
FIGS. 8A to 8C are diagrams showing a sectional view 404 (FIG. 8A) which is one example of a sectional view 401 of an axial direction, a sectional view 405 (FIG. 8C) which is one example of a sectional view 402 of a sagittal direction, and a sectional view 406 (FIG. 8B) which is one example of a sectional view 403 of a coronal direction.
Figure 8B:
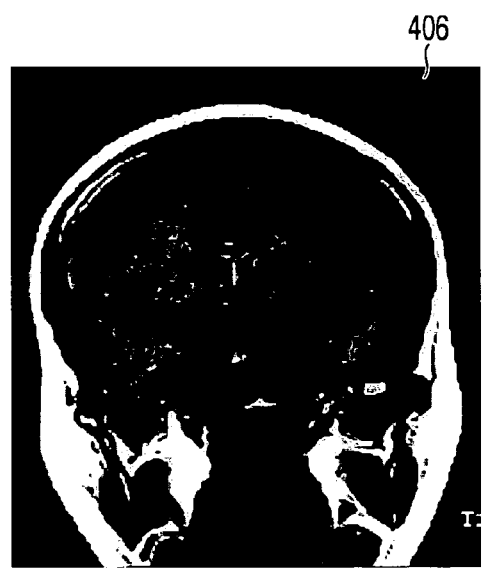
Figure 8C:

FIGS. 8A to 8C show a sectional view 404 (FIG. 8A) which is one example of the sectional view 401 of the axial direction, a sectional view 405 (FIG. 8C) which is one example of the sectional view 402 of the sagittal direction, and a sectional view 406 (FIG. 8B) which is one example of the sectional view 403 of the coronal direction. For the sectional views 401 to 403 of the respective directions, a distance between the sectional views is 5 mm.

In the step S106, the two-dimensional sectional image produced in the step S105 is received as input data.

In the step S108, the two-dimensional feature value is extracted from the two-dimensional image inputted in the step S106. As the feature value, the histogram obtained by quantizing the gray values which can be calculated from the two-dimensional image, the shape histogram obtained by quantizing the edge differentials, the position and size of the region of interest, and the like are used. These feature values may also be extracted from the whole image which is the object, or may also be extracted from the noticed region of interest.

It is to be noted that the region of interest in the present embodiment includes the tumor or the portion as the landmark which is noticed by the user and in which the user has interest.

Next, the operation procedure in the search unit 4 will be described with reference to FIG. 5. In the step S201, the patient's CT/MRI slice image which is a diagnosis object is inputted as the two-dimensional image data 211. For the two-dimensional image data 211 inputted in the step S201, the function of setting the region of interest provided by the two-dimensional image input section 10 of FIG. 1 is used to extract the region of interest from the slice image of CT/MRI. A plurality of regions of interest may also be disposed in the image. The two-dimensional image data 211 may be any of the axial sectional view, sagittal sectional view, and coronal sectional view. A plurality of two-dimensional image data 211 may also be inputted.

The similarity calculation process performed in the steps S204, S205, S210, and S206 is performed in the same manner as in the first embodiment using the two-dimensional feature values extracted from the sectional views 401 to 403 of FIG. 7.

The result of the similarity search performed in the step S206 is displayed in the search result display section 14 of FIG. 1. This search result is the past case including the tumor similar to that found from the patient's CT/MRI slice image which is the diagnosis object.

A doctor who is the user refers to the past case displayed as the search result to determine a diagnosis policy.

(Effect)

Next, the effect of the embodiment of the present invention will be described. In the registration unit 1, a plurality of two-dimensional sectional images are automatically produced from the CT/MRI three-dimensional data in the step S105, and the feature values are extracted from these two-dimensional sectional images in the step S108. Accordingly, in the search unit 4, the similarity search is possible between the CT/MRI two-dimensional slice image inputted in the step S201 and the two-dimensional sectional image produced in the step S105.

Since the feature value extracted from the two-dimensional sectional image produced in the step S105 is associated with the original CT/MRI three-dimensional data by the link information registered in the feature value database 3, the original CT/MRI three-dimensional data and case medical record can be designated from the feature value data of the arbitrary two-dimensional sectional image.

That is, according to the present embodiment, the CT/MRI slice image which is the two-dimensional image is used as the search key and the similarity search is possible with respect to the CT/MRI three-dimensional data.

Since the CT/MRI two-dimensional slice image can be designated as the search key, it is not necessary to browse a large amount of CT/MRI three-dimensional data registered in the database or to look for the case data similar to that of the patient which is the diagnosis object.

As a result, the user can search for the CT/MRI three-dimensional data and case data similar to those of the patient which is the diagnosis object with the simpler means.

In the step S105, a plurality of two-dimensional sectional images are automatically produced from the CT/MRI three-dimensional data.

When the CT/MRI three-dimensional data is cut out as the two-dimensional sectional image, for example, as in the sectional images in 404 to 406 of FIGS. 8A to 8C, the sectional images obtained from the same CT/MRI three-dimensional data 400 are largely different from one another in accordance with the cut position and the direction.

Therefore, even when only one sectional image is prepared from the CT/MRI three-dimensional data 400, a possibility that the image is similar to the CT/MRI slice image inputted by the user in the step S201 is low.

In the present embodiment, the sectional images are produced at a pitch of 5 mm from three directions of the CT/MRI three-dimensional data.

As a result, when inputting the patient's CT/MRI slice image, the user does not have to worry about any of the axial, sagittal, and coronal directions in which the slice image is photographed, and can easily perform the similarity search for the CT/MRI three-dimensional data from the CT/MRI slice image and easily obtain the case similar to the patient.

It is to be noted that the CT/MRI three-dimensional data registered in the original object database 2 may also be three-dimensional data prepared by stacking the two-dimensional data photographed by CT and/or MRI.

Moreover, the three-dimensional data may also be prepared by combining the two-dimensional data photographed from each of the axial, coronal, and sagittal directions.

The sectional images 401 to 403 cut from the CT/MRI three-dimensional data 400 are not limited to the axial, sagittal, and coronal directions, and may also be arbitrary sections passing through a center of the CT/MRI three-dimensional data 400.

Moreover, the sections may also extend along a plurality of directions passing through an arbitrary rotation axis.

Furthermore, the direction of a line of view at the time of operation may be used as a reference, and a plane vertical to the direction of the line of view, and two planes constituting an intersection which is the direction of the line of view may be used.

Additionally, the directions in which the sections are produced are not limited to three directions, and only one direction or a plurality of directions may also be used.

Moreover, for example, the cut-out section may one-dimensionally be converted and deformed like an image obtained from an ultrasonic diagnosis apparatus.

Furthermore, the interval between the sectional images is not limited to 5 mm, and can freely be set by the user.

This interval may also differ with each CT/MRI three-dimensional data to be registered.

The feature value data registered in the feature value database 312 is not limited to the normalized mode, and the mode may also be dynamically normalized at the time of the execution of the similarity search.

The three-dimensional data to be registered is not limited to the data obtained from CT and/or MRI, and may also be, for example, three-dimensional data prepared based on the image obtained from the ultrasonic diagnosis apparatus.

Similarly, also the two-dimensional image inputted as the search key is not limited to the image obtained from the CT and/or MRI, and may be, for example, the two-dimensional image obtained from the ultrasonic diagnosis apparatus.

It is to be noted that in the above-described embodiment, the extracting of the three-dimensional or two-dimensional feature value includes both the calculating of the feature value by the calculation process at the time and the storing of pre-calculated feature value into predetermined storage means to read the amount from the means as required.

Each constitution described in the present claims will hereinafter be described in association with the above-described embodiment.

(1) A three-dimensional model search method for using a feature value of a three-dimensional model to search for a similar three-dimensional model, comprising:

a search object image production step of producing a plurality of two-dimensional images obtained by observing the three-dimensional model as an object of search from points of view different from one another;

a first feature value extraction step of extracting the respective feature values of the two-dimensional images from the plurality of two-dimensional images produced in the search object image production step;

a search key input step of inputting a two-dimensional image which is a search key;

a second feature value extraction step of extracting the feature value from the two-dimensional image which is the search key inputted in the search key input step; and a similarity search step of using the feature values extracted in the first and second feature value extraction steps to carry out similarity search, and outputting a three-dimensional model which is similar to the search key.

(Corresponding Embodiment of the Invention)

The first, second, and third embodiments correspond to the embodiment relating to this invention.

Figure 2:
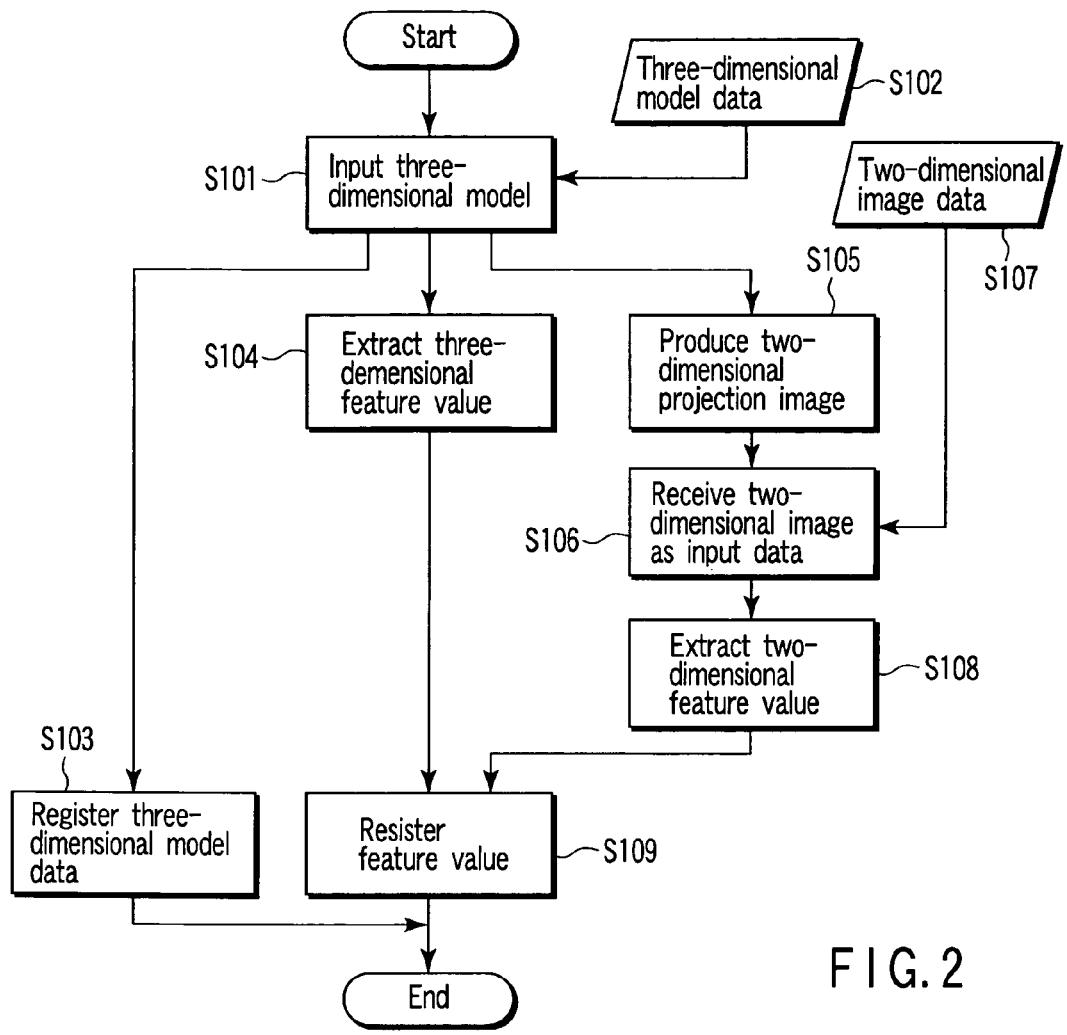
FIG. 2 is a flowchart showing an operation procedure in a registration unit 1.

In the constitution, the "step of producing the plurality of two-dimensional images obtained by observing the three-dimensional model as the object of the search from the points of view different from one another" corresponds to the step S105 of FIG. 2. A concrete example of this step S105 has been described with reference to FIGS. 3 and 4.

In the constitution, the "step of extracting the respective feature values of the two-dimensional images from the plurality of two-dimensional images" corresponds to the step S108 of FIG. 2 in the first, second, and third embodiments.

Figure 5:
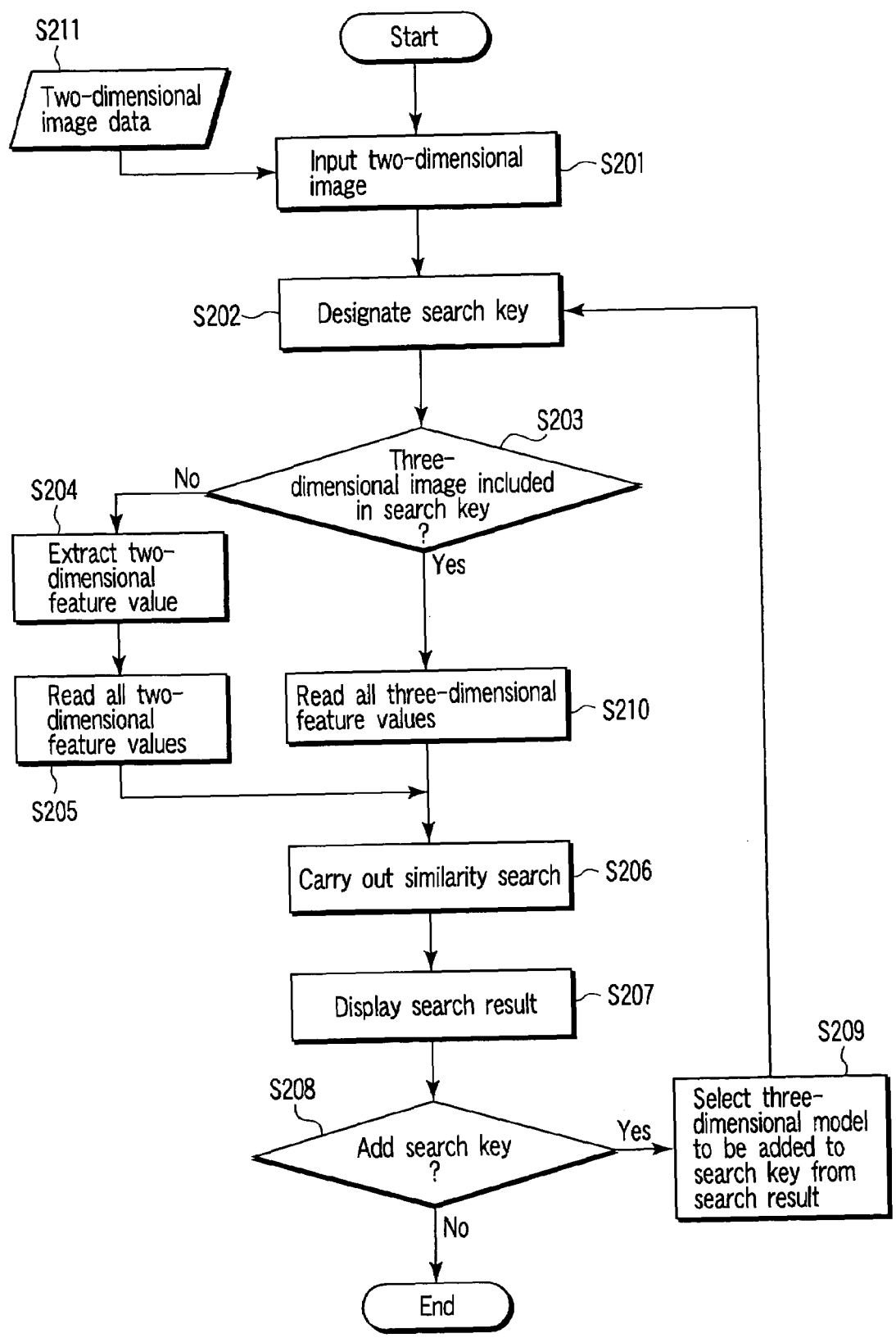
FIG. 5 is a flowchart showing the operation procedure in a search unit 2.

In the constitution, the "step of inputting a two-dimensional image which is a search key" corresponds to the step S201 of FIG. 5 in the first, second, and third embodiments.

In the constitution, the "step of extracting the feature value from the two-dimensional image which is the search key" corresponds to the step S204 of FIG. 5 in the first, second, and third embodiments.

In the constitution, the "step of carrying out similarity search, and outputting a three-dimensional model which is similar to the search key" corresponds to the step S206 of FIG. 5. However, a concrete similarity calculation technique is not limited to the calculation method of the similarity based on the Euclidean distance in the n-dimensional space constituted of the difference of the respective feature values, which has been described in these embodiments, and also includes generally known other calculation methods such as the calculation method using the Mahalanobis distance.

It is to be noted that term "three-dimensional model" in the constitution includes three-dimensional geometric data and three-dimensional phase data produced by CAD.

Moreover, the model also includes three-dimensional polygon data produced by three-dimensional measurement in the generally known methods such as a silhouette method and slit method.

Furthermore, voxel data produced from data such as CT or MRI is also included.

Additionally, pseudo three-dimensional data obtained by representing the two-dimensional image represented by Quick Time VR in accordance with the position of a three-dimensional point of view.

(Function)

In the present invention, the similarity search using the feature value of the two-dimensional image is performed with respect to the database in which the three-dimensional model is accumulated.

The "step of producing a plurality of two-dimensional images obtained by observing the three-dimensional model as an object of search from the points of view different from one another" will be described.

The image of the three-dimensional model (described as the projection image and/or the sectional image herein) largely differs with a position/posture relation between the three-dimensional model and the point of view and/or the cut position and posture of the three-dimensional model.

For example, even with the projection image of the same three-dimensional model, the projection image of a front face of the three-dimensional model, that of a side face, and that of an upper face are largely different images.

Moreover, even with the sectional image of the same three-dimensional model, the sectional image of the axial direction, that of the coronal direction, and that of the sagittal direction are largely different images.

In the present invention, in the step of producing the two-dimensional projection image and/or the sectional image from the three-dimensional model to be registered, a plurality of projection images and/or sectional images are produced. Therefore, when the search is performed, and even when the user inputs the two-dimensional image viewed from a certain direction and/or the sectional image of the certain direction as the search key, a possibility that the two-dimensional image is an image similar to the two-dimensional projection image and/or the sectional image produced from the three-dimensional model is high.

Therefore, even when there are only a small number of two-dimensional images inputted as the search key, the similar three-dimensional model can be searched.

Additionally, the "step of producing a plurality of two-dimensional images obtained by observing the three-dimensional model as the object of search from the points of view different from one another" is performed at the time of the performing of the similarity search in some case, and performed at the time of the registering of the three-dimensional model in the other case.

When the "step of producing the plurality of two-dimensional images" is performed at the time of the performing of the similarity search, and when the three-dimensional model is registered, only the three-dimensional model is registered. When there is a request for the similarity search, the three-dimensional model as the search object is read, the plurality of two-dimensional images are produced, and the respective feature values are extracted from the two-dimensional images.

Moreover, when the "step of producing the plurality of two-dimensional images" is performed at the time of the registering of the three-dimensional model, the "step of extracting the respective feature values from the plurality of two-dimensional images" is performed at the time of the performing of the similarity search in some case, and performed at the time of the registering of the three-dimensional model in the other case.

When the "step of extracting the respective feature values from the plurality of two-dimensional images" is performed at the time of the performing of the similarity search, and when the three-dimensional model is registered, the three-dimensional model and the two-dimensional image corresponding to the three-dimensional model are registered. When there is the request for the similarity search, the two-dimensional image corresponding to the three-dimensional model as the search object is read, and the feature value is extracted from the two-dimensional image.

Moreover, when the "step of extracting the respective feature values from the plurality of two-dimensional images" is performed at the time of the registering of the three-dimensional model, and when the three-dimensional model is registered, the plurality of two-dimensional images are produced, and the feature value of the two-dimensional image is extracted. When the similarity search is carried out, the feature value of the two-dimensional image corresponding to the three-dimensional model as the search object is read.

It is to be noted that in this case, the two-dimensional image corresponding to the three-dimensional model does not have to be registered.

That is, the function of the present invention includes a mode in which the plurality of two-dimensional images are produced and/or the feature value is extracted from the two-dimensional image every search request, and a mode in which the plurality of two-dimensional images are produced and/or the feature value is extracted from the two-dimensional image every registration of the three-dimensional model. The three-dimensional model search method described in (1) includes both the modes.

(Effect)

The search key for the search object accumulated in the database has not heretofore been set from the data other than at least the model data of the search object.

Moreover, although the three-dimensional model and the two-dimensional model derived from the three-dimensional model indicate the same model, feature value information held by the respective models differs.

Therefore, when the three-dimensional model is searched, only the setting of the three-dimensional model also in the search key is considered.

Therefore, to input the shape to be searched by the user as the three-dimensional model into the system, three-dimensional modeling applications such as CAD are used to prepare the three-dimensional model. Alternatively, apparatuses such as a three-dimensional scanner are used to take in the existing three-dimensional body as the data and the three-dimensional model is prepared. The user cannot help using such means.

Therefore, even when a three-dimensional model preparing application is used, skills are required for the operation in preparing the three-dimensional model in this type of application. Therefore, it is not easy to prepare the three-dimensional model as the search key.

Moreover, for example, even when the three-dimensional scanner is used to take in the existing three-dimensional body as the data, it is not easy to prepare the three-dimensional scanner. Furthermore, it is not easy to reconstruct the information taken in with the three-dimensional scanner as the three-dimensional data.

In the present invention, the user can input the shape information to be searched as the two-dimensional image, and use the two-dimensional image as the search key to carry out the three-dimensional model similarity search. Therefore, the user can easily prepare the data as the search key to search the three-dimensional model.

That is, it is easy for the user to prepare search key data, and the model can be searched without listing the search objects. Therefore, practical search environment can be provided.

(2) The three-dimensional model search method described in (1) in which the two-dimensional image produced in the search object image production step is a two-dimensional projection image and/or a sectional image which corresponds to the three-dimensional model.

(Corresponding Embodiment of the Invention)

The embodiment relating to this invention corresponds to the first, second, and third embodiments.

The "step or producing the two-dimensional projection image and/or the sectional image corresponding to the three-dimensional model" in the constitution corresponds to the step S105 of FIG. 2 in the first, second, and third embodiments.

Term "two-dimensional projection image" in the constitution includes an image produced by rendering the three-dimensional model as the two-dimensional image observed from a certain point of view.

Moreover, the image also includes an image obtained by conversion of the three-dimensional model into the two-dimensional information by an arbitrary view field coordinate conversion matrix and an image obtained by cutting an arbitrary portion from the image.

Term "sectional image" in the constitution is a two-dimensional image indicating a section at the time of the cutting of the three-dimensional model in a certain position/posture, and also includes an image obtained by cutting the three-dimensional model represented by polygon or voxel.

Moreover, the image also includes an image obtained by further primary conversion of the two-dimensional image indicating the section at the time of the cutting of the three-dimensional model.

(Function/Effect)

In the present invention, since the two-dimensional projection image and/or the sectional image is produced from the three-dimensional image, it is not necessary to separately prepare the two-dimensional image representing the three-dimensional model to be registered.

As a result, when only the three-dimensional model is registered, the two-dimensional image can be used as the search key to carry out the three-dimensional model search.

(3) The three-dimensional model search method described in (2) in which the two-dimensional projection image and/or the sectional image includes texture information.

(Corresponding Embodiment of the Invention)

The embodiment relating to this invention corresponds to the third embodiment.

The term "two-dimensional projection image-and/or the sectional image" in the constitution corresponds to the sectional images 401 to 403 of FIG. 7 and the sectional images 404 to 406 of FIGS. 8A to 8C in the third embodiment.

The term "texture information" in the constitution includes a histogram obtained by quantifying the gray values possessed by the two-dimensional projection image and the sectional image and a shape histogram obtained by quantifying the edge differentials.

(Function/Effect)

In the present invention, since the sectional image produced from the three-dimensional model to be registered includes the texture information, a change of the gray value can be used as the feature value.

As a result, more feature values can be obtained from the sectional image which is the two-dimensional image. Therefore, the two-dimensional image can be used as the search key to perform the three-dimensional model search with high precision.

(4) The three-dimensional model search method described in (1), further comprising: a storage step of storing the three-dimensional model as the object of the search, the feature value extracted in the first feature value extraction step, and correspondence information indicating correspondence between the three-dimensional model and the feature value extracted in the first feature value extraction step.

(Corresponding Embodiment of the Invention)

The embodiment relating to this invention corresponds to the first, second, and third embodiments.

The "storage step" in the constitution corresponds to the steps S103 and S109 of FIG. 2 in the first, second, and third embodiments.

The term "correspondence information" in the constitution includes information capable of specifying even another information and, for example, represented as XLink and/or XPath of XML, when there are a plurality of sets of information and one of the sets is specified.

(Function/Effect)

In the present invention, even when the similarity search is performed from the feature value extracted from the two-dimensional image as the search key and that extracted from the two-dimensional image corresponding to the three-dimensional model as the search object, the corresponding two-dimensional image and/or three-dimensional model can be specified from the feature value obtained as the search result.

As a result, even in the similarity search in which the two-dimensional image is the search key, the three-dimensional model can be obtained as the search result.

(5) The three-dimensional model search method described in (1), further comprising:

a three-dimensional feature value extraction step of extracting a three-dimensional feature value from the three-dimensional model as the object of the search; and a second similarity search step of selecting the three-dimensional feature value of the three-dimensional model outputted as a search result of the similarity search step to search for the three-dimensional feature value of each three-dimensional model extracted in the three-dimensional feature value extraction step, and outputting a three-dimensional model which has the three-dimensional feature value similar to the search key.

(Corresponding Embodiment of the Invention)

The embodiment relating to this invention corresponds to the first, second, and third embodiments.

The "step of selecting the three-dimensional feature value of the outputted three-dimensional model as the search key" in the constitution corresponds to the step S209 of FIG. 5 in the first, second, and third embodiments.

(Function/Effect)

The two-dimensional projection image is merely a one-sided drawing mode of the three-dimensional model. Moreover, similarly the sectional image is merely a one-sided cut section drawing mode of the three-dimensional model. Therefore, when the feature value capable of being extracted from the two-dimensional projection image and/or the sectional image of the three-dimensional model is compared with that capable of being extracted from the three-dimensional model itself, the latter has more information amount. That is, the comparison of the three-dimensional models realizes the search having a precision higher than that in the comparison of the two-dimensional images.

In the present invention, the three-dimensional model outputted as the search result can be designated again as the search key. When the search is repeated to narrow down the results, and even when the initial search uses the two-dimensional image as the key, the three-dimensional model can be designated as the search key based on the previous result in second and subsequent searches.

As a result, the user can perform the search with the higher precision, reflecting a user's will.

(6) A three-dimensional model search apparatus which uses a feature value of a three-dimensional model to search for a similar three-dimensional model, comprising:

a search object image production section which produces a plurality of two-dimensional images obtained by observing the three-dimensional model as an object of search from points of view different from one another;

a first feature value extraction section which extracts the respective feature values of the two-dimensional images from the plurality of two-dimensional images produced by the search object image production section;

a search key input section which inputs a two-dimensional image as a search key;

a second feature value extraction section which extracts the feature value from the two-dimensional image as the search key inputted via the search key input section; and a similarity search section which uses the feature values extracted by the first and second feature value extraction sections to carry out similarity search and which outputs a three-dimensional model similar to the search key.

(Corresponding Embodiment of the Invention)

The embodiment relating this invention corresponds to the first, second, and third embodiments.

The "means for producing the plurality of two-dimensional images obtained by observing the three-dimensional model as the object of the search from the points of view different from each other" corresponds to the two-dimensional projection image production section 7 of FIG. 1 in the first and third embodiments, and to the two-dimensional projection image production section 308 of FIG. 6 in the second embodiment. The concrete example of the two-dimensional projection image production has been described with reference to FIGS. 3 and 4.

In the constitution, the "means for extracting the respective feature values of the two-dimensional images from the plurality of two-dimensional images" corresponds to the two-dimensional feature value extraction section 9 of FIG. 1 in the first and third embodiments, and to the two-dimensional feature value extraction section 309 of FIG. 6 in the second embodiment.

In the constitution, the "means for inputting a two-dimensional image as the search key" corresponds to the two-dimensional image input section 10 and search key designation section 11 of FIG. 1 in the first and third embodiments, and to the two-dimensional image input section 313 and search key designation section 314 of FIG. 6 in the second embodiment.

In the constitution, the "means for extracting the feature value from the two-dimensional image as the search key" corresponds to the two-dimensional feature value extraction section 12 of FIG. 1 in the first and third embodiments, and to the two-dimensional feature value extraction section 315 of FIG. 6 in the second embodiment.

In the constitution, the "means for carrying out the similarity search" corresponds to the similarity search section 13 of FIG. 1 in the first and third embodiments, and to the similarity search section 316 of FIG. 6 in the second embodiment. However, the concrete similarity calculation method is not limited to the calculation method of the similarity based on the Euclidean distance in the n-dimensional space constituted of the difference of the respective feature values, which has been described in these embodiments, and also includes the generally known other calculation methods such as the calculation method using the Mahalanobis distance.

The term "three-dimensional model" in the constitution includes the three-dimensional geometric data and three-dimensional phase data produced by CAD.

Moreover, the model also includes the three-dimensional polygon data produced by the three-dimensional measurement in the generally known methods such as the silhouette method and slit method.

Furthermore, the voxel data produced from the data such as CT and MRI is also included.

Additionally, the pseudo three-dimensional data obtained by representing the two-dimensional image represented by Quick Time VR in accordance with the position of the three-dimensional point of view.

(Function)

In the present invention, the similarity search using the feature value of the two-dimensional image is performed with respect to the database in which the three-dimensional model is accumulated.

The "means for producing the plurality of two-dimensional images obtained by observing the three-dimensional model as the object of the search from the points of view different from one another" will be described.

The image of the three-dimensional model (described as the projection image and/or the sectional image herein) largely differs with the position/posture relation between the three-dimensional model and the point of view and/or the cut position and posture of the three-dimensional model.

For example, even with the projection image of the same three-dimensional model, the projection image of the front face of the three-dimensional model, that of the side face, and that of the upper face are the largely different images.

Moreover, even with the sectional image of the same three-dimensional model, the sectional image of the axial direction, that of the coronal direction, and that of the sagittal direction are the largely different images.

In the present invention, in the means for producing the two-dimensional projection image and/or the sectional image from the three-dimensional model to be registered, the plurality of projection images and/or sectional images are produced. Therefore, when the search is performed, and even when the user inputs the two-dimensional image viewed from the certain direction and/or the sectional image of the certain direction as the search key, the possibility that the two-dimensional image is the image similar to the two-dimensional projection image and/or the sectional image produced from the three-dimensional model is high.

Therefore, even when there are only a small number of two-dimensional images inputted as the search key, the similar three-dimensional model can be searched.

Additionally, the "means for producing the plurality of two-dimensional images obtained by observing the three-dimensional model as the object of the search from the points of view different from one another" operates at the time of the performing of the similarity search in some case, and operates at the time of the registering of the three-dimensional model in the other case.

When the "means for producing the plurality of two-dimensional images" operates at the time of the performing of the similarity search, and when the three-dimensional model is registered, only the three-dimensional model is registered. When there is the request for the similarity search, the three-dimensional model as the search object is read, the corresponding two-dimensional image is inputted, and the feature value is extracted from the two-dimensional image.

Moreover, when the "means for producing the plurality of two-dimensional images" operates at the time of the registering of the three-dimensional model, the "means for extracting the respective feature values from the plurality of two-dimensional images" operates at the time of the performing of the similarity search in some case, and operates at the time of the registering of the three-dimensional model in the other case.

When the "means for extracting the respective feature values from the plurality of two-dimensional images" operates at the time of the performing of the similarity search, and when the three-dimensional model is registered, the three-dimensional model and the two-dimensional image corresponding to the three-dimensional model are registered. When there is the request for the similarity search, the two-dimensional image corresponding to the three-dimensional model as the search object is read, and the feature value is extracted from the two-dimensional image.

Moreover, when the "means for extracting the respective feature values from the plurality of two-dimensional images" operates at the time of the registering of the three-dimensional model, and when the three-dimensional model is registered, the two-dimensional image corresponding to the three-dimensional model is inputted, and the feature value of the two-dimensional image is extracted. When the similarity search is carried out, the feature value of the two-dimensional image corresponding to the three-dimensional model as the search object is read.

It is to be noted that in this case, the two-dimensional image corresponding to the three-dimensional model does not have to be registered.

That is, the function of the present invention includes the mode in which the two-dimensional image corresponding to the three-dimensional model is inputted and/or the feature value is extracted from the two-dimensional image every search request, and the mode in which the two-dimensional image corresponding to the three-dimensional model is inputted and/or the feature value is extracted from the two-dimensional image every registration of the three-dimensional model. The three-dimensional model search apparatus described in (6) includes both the modes.

(Effect)

The search key for the search object accumulated in the database has not heretofore been set from the data other than at least the model data of the search object.

Moreover, although the three-dimensional model and the two-dimensional model derived from the three-dimensional model indicate the same model, the feature value information held by the respective models differs.

Therefore, when the three-dimensional model is searched, only the setting of the three-dimensional model also in the search key is considered.

Therefore, to input the shape to be searched by the user as the three-dimensional model into the system, the three-dimensional modeling applications such as CAD are used to prepare the three-dimensional model. Alternatively, the apparatuses such as the three-dimensional scanner are used to take in the existing three-dimensional body as the data and the three-dimensional model is prepared. The user cannot help using such means.

Therefore, even when the three-dimensional model preparing application is used, skills are required for the operation in preparing the three-dimensional model in this type of application. Therefore, it is not easy to prepare the three-dimensional model as the search key.

Moreover, for example, even when the three-dimensional scanner is used to take in the existing three-dimensional body as the data, it is not easy to prepare the three-dimensional scanner. Furthermore, it is not easy to reconstruct the information taken in with the three-dimensional scanner as the three-dimensional data.

In the present invention, the user can input the shape information to be searched as the two-dimensional image, and use the two-dimensional image as the search key to carry out the three-dimensional model similarity search. Therefore, the user can easily prepare the data as the search key to search the three-dimensional model.

That is, it is easy for the user to prepare the search key data, and the model can be searched without listing the search objects. Therefore, the practical search environment can be provided.

(7) The three-dimensional model search apparatus described in (6) in which the two-dimensional image produced in the search object image production section is a two-dimensional projection image and/or a sectional image which corresponds to the three-dimensional model.

(Corresponding Embodiment of the Invention)

The embodiment relating to this invention corresponds to the first, second, and third embodiments.

The "means for producing the two-dimensional projection image corresponding to the three-dimensional model" in the constitution corresponds to the two-dimensional projection image production section 7 of FIG. 1 in the first and third embodiments, and to the two-dimensional projection image production section 308 of FIG. 6 in the second embodiment.

The term "two-dimensional projection image" in the constitution includes the image produced by rendering the three-dimensional model as the two-dimensional image observed from the certain point of view.

Moreover, the image also includes the image obtained by the conversion of the three-dimensional model into the two-dimensional information by the arbitrary view field coordinate conversion matrix, and the image obtained by cutting the arbitrary portion from the image.

The term "sectional image" in the constitution is a two-dimensional image indicating the section at the time of the cutting of the three-dimensional model in the certain position/posture, and also includes the image obtained by cutting the three-dimensional model represented by polygon or voxel.

Moreover, the image also includes the image obtained by further the primary conversion of the two-dimensional image indicating the section at the time of the cutting of the three-dimensional model.

(Function/Effect)

In the present invention, since the two-dimensional projection image is produced from the three-dimensional image, it is not necessary to separately prepare the two-dimensional image representing the three-dimensional model to be registered.

As a result, when only the three-dimensional model is registered, the two-dimensional image can be used as the search key to carry out the three-dimensional model search.

(8) The three-dimensional-model search apparatus described in (7) in which the two-dimensional projection image and/or the sectional image includes texture information.

(Corresponding Embodiment of the Invention)

The embodiment relating to this invention corresponds to the third embodiment.

The term "two-dimensional projection image and/or the sectional image" in the constitution corresponds to the sectional images 401 to 403 of FIG. 7 and the sectional images 404 to 406 of FIG. 8 in the third embodiment.

The term "texture information" in the constitution includes the histogram obtained by quantifying the gray values possessed by the two-dimensional projection image and the sectional image, and the shape histogram obtained by quantifying the edge differentials.

(Function/Effect)

In the present invention, since the sectional image produced from the three-dimensional model to be registered includes the texture information, the change of the gray value can be used as the feature value.

As a result, more feature values can be obtained from the sectional image which is the two-dimensional image. Therefore, the two-dimensional image can be used as the search key to perform the three-dimensional model search with the high precision.

(9) The three-dimensional model search apparatus described in (6), further comprising: a storage section which stores the three-dimensional model as the object of the search, the feature value extracted in the first feature value extraction section, and correspondence information indicating correspondence between the three-dimensional model and the feature value extracted in the first feature value extraction section.

(Corresponding Embodiment of the Invention)

The embodiment relating to this invention corresponds to the first, second, and third embodiments.

The "storage means" in the constitution corresponds to the original object database 2 and feature value database 3 of FIG. 1 in the first and third embodiments.

The term "correspondence information" in the constitution includes the information capable of specifying even the other information and, for example, represented as XLink and/or XPath of XML, when there are a plurality of sets of information and one of the sets is specified.

(Function/Effect)

In the present invention, even when the similarity search is performed from the feature value extracted from the two-dimensional image as the search key and that extracted from the two-dimensional image corresponding to the three-dimensional model as the search object, the corresponding two-dimensional image and/or three-dimensional model can be specified from the feature value obtained as the search result.

As a result, even in the similarity search in which the two-dimensional image is the search key, the three-dimensional model can be obtained as the search result.

(10) The three-dimensional model search apparatus described in (6), further comprising:

a three-dimensional feature value extraction section which extracts a three-dimensional feature value from the three-dimensional model as the object of the search; and a second similarity search section which uses the three-dimensional feature value of the three-dimensional model outputted as the search result in the similarity search section to search for the three-dimensional feature value of each three-dimensional model extracted in the three-dimensional feature value extraction section and which outputs the three-dimensional model having the three-dimensional feature value similar to the search key.

(Corresponding Embodiment of the Invention)

The embodiment relating to this invention corresponds to the first, second, and third embodiments.

The "means for selecting the three-dimensional feature value of the outputted three-dimensional model as the search key" in the constitution corresponds to the search result display section 14 and search key designation section 11 of FIG. 1 in the first and third embodiments, and to the search result display section 317 and search key designation section 314 of FIG. 6 in the second embodiment.

(Function/Effect)

The two-dimensional projection image is merely the one-sided drawing mode of the three-dimensional model.

Moreover, similarly the sectional image is merely the one-sided cut section drawing mode of the three-dimensional model.

Therefore, when the feature value capable of being extracted from the two-dimensional projection image and/or the sectional image of the three-dimensional model is compared with that capable of being extracted from the three-dimensional model itself, the latter has more information amount.

That is, the comparison of the three-dimensional models realizes the search having the precision higher than that in the comparison of the two-dimensional images.

In the present invention, the three-dimensional model outputted as the search result can be designated again as the search key.

When the search is repeated to narrow down the results, and even when the initial search uses the two-dimensional image as the key, the three-dimensional model can be designated as the search key based on the previous result in the second and subsequent searches.

As a result, the user can perform the search with the higher precision, reflecting the user's will.

(11) A three-dimensional model search program which allows a computer to calculate a feature value of a three-dimensional model and to search for a similar three-dimensional model using the feature value, and allows the computer to realize:

a search object image production function of producing a plurality of two-dimensional images obtained by observing the three-dimensional model as an object of search from points of view different from one another;

a first feature value extraction function of extracting the respective feature values of the two-dimensional images from the plurality of two-dimensional images produced by the search object image production function;

a search key input function of inputting a two-dimensional image as a search key;

a second feature value extraction function of extracting the feature value from the two-dimensional image as the search key inputted by the search key input function; and a similarity search function of using the feature values extracted by the first and second feature value extraction functions to carry out similarity search, and outputting a three-dimensional model similar to the search key.

The (Corresponding Embodiment of the Invention) and (Function/Effect) of (11) are similar to those of (1).

(12) A three-dimensional model search system which calculates a feature value of a three-dimensional model and uses this feature value to search for a similar three-dimensional model, comprising:

a first feature value extraction section which extracts the respective feature values of two-dimensional images from a plurality of two-dimensional images obtained by observing the three-dimensional model as an object of search from points of view different from one another;

a second feature value extraction section which receives a two-dimensional image as a search key transmitted from a client via a network to extract a feature value of the two-dimensional image; and a similarity search section which uses the feature values extracted in the first and second feature value extraction sections to carry out similarity search and which transmits information about a three-dimensional model similar to the search key to the client via the network.

(Corresponding Embodiment of the Invention)

The embodiment relating to this invention corresponds to the second embodiment.

The network in the constitution corresponds to the internet of FIG. 6, and also includes the forming of the network by LAN and a circuit for exclusive use.

(Function/Effect)

In the present invention, a user environment of a search function is connected to an apparatus for performing the similarity search via the network. Therefore, the user does not have to prepare the three-dimensional model search apparatus, and can easily use only the function.

Moreover, the three-dimensional search apparatus is shared among a plurality of users, and the search function can be used.

(13) A three-dimensional model search apparatus which uses a feature value of a three-dimensional model to search for a similar three-dimensional model, comprising:

search object image production means for producing a plurality of two-dimensional images obtained by observing the three-dimensional model as an object of search from points of view different from one another;

first feature value extraction means for extracting the respective feature values of the two-dimensional images from the plurality of two-dimensional images produced by the search object image production means;

search key input means for inputting a two-dimensional image as a search key;

second feature value extraction means for extracting the feature value from the two-dimensional image as the search key inputted by the search key input means; and similarity search means for using the feature values extracted by the first and second feature value extraction means to carry out similarity search, and outputting a three-dimensional model which is similar to the search key.

The (Corresponding Embodiment of the Invention) and (Function/Effect) of (13) are similar to those of (6).

According to the present invention, since the two-dimensional image can be used as the search key to perform the three-dimensional model similarity search, the user easily prepares the data as the search key and can search the three-dimensional model.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A three-dimensional model search method of searching for a specific three-dimensional model of a plurality of three-dimensional models, comprising:

a search object image production step of producing a plurality of two-dimensional images obtained by observing the specific three-dimensional model as an object of search from points of view different from one another based on the specific three-dimensional model;

a search object storage step for storing three-dimensional model information regarding the specific three-dimensional model and two-dimensional image information regarding the plurality of two-dimensional images;

a search key input step of inputting a two-dimensional image as a search key;

a comparison step for comparing a similarity of the two-dimensional image input as the search key with similarities of the plurality of two-dimensional images for which the two-dimensional image information is stored in the search object storage step, the comparison step being carried out based on feature values, which are parameter values obtained based on color components as a histogram obtained by quantizing values for respective color information, which is contained as those image components of image components in each of the two-dimensional images, which enable the similarities to be determined, and a shape histogram obtained by quantizing edge differentials;

a determination step for determining similarities of the two-dimensional images based on a result of comparison in the comparison step; and a three-dimensional model specification step for specifying a three-dimensional model associated with a two-dimensional image whose similarity is determined to be high in the determination step.

2. The three-dimensional model search method according to claim 1, wherein the two-dimensional image produced in the search object image production step is a two-dimensional projection image and/or a sectional image which corresponds to the three-dimensional model.

3. The three-dimensional model search method according to claim 2, wherein the two-dimensional projection image and/or the sectional image includes texture information.

4. A three-dimensional model search apparatus for searching for a specific three-dimensional model of a plurality of three-dimensional models, comprising:

a search object image production section which produces a plurality of two-dimensional images obtained by observing the specific three-dimensional model as an object of search from points of view different from one another based on the specific three-dimensional model;

a search object storage section for storing three-dimensional model information regarding the specific three-dimensional model and two-dimensional image information regarding the plurality of two-dimensional images;

a search key input section which inputs a two-dimensional image as a search key;

a comparison section for comparing a similarity of the two-dimensional image input as the search key with similarities of the plurality of two-dimensional images for which the two-dimensional image information is stored in the search object storage section, the comparison being carried out based on feature values, which are parameter values obtained based on color components as a histogram obtained by quantizing values for respective color information, which is contained as those image components of image components in each of the two-dimensional images, which enable the similarities to be determined, and a shape histogram obtained by quantizing edge differentials;

a determination section for determining similarities of the two-dimensional images based on a result of comparison in the comparison section; and a three-dimensional model specification section for specifying a three-dimensional model associated with a two-dimensional image whose similarity is determined to be high in the determination section.

5. The three-dimensional model search apparatus according to claim 4, wherein the two-dimensional image produced in the search object image production section is a two-dimensional projection image and/or a sectional image which corresponds to the three-dimensional model.

6. The three-dimensional model search apparatus according to claim 5, wherein the two-dimensional projection image and/or the sectional image includes texture information.

7. A three-dimensional model search program which allows a computer to search for a specific three-dimensional model of a plurality of three-dimensional models and which allows the computer to realize:

a search object image production function of producing a plurality of two-dimensional images obtained by observing the specific three-dimensional model as an object of search from points of view different from one another based on the specific three-dimensional model;

a search object storage function for storing three-dimensional model information regarding the specific three-dimensional model and two-dimensional image information regarding the plurality of two-dimensional images;

a comparison function for comparing a similarity of the two-dimensional image input as the search key with similarities of the plurality of two-dimensional images for which the two-dimensional image information is stored in the search object storage function, the comparison function being carried out based on feature values, which are parameter values obtained based on color components as a histogram obtained by quantizing values for respective color information, which is contained as those image components of image components in each of the two-dimensional images, which enable the similarities to be determined, and a shape histogram obtained by quantizing edge differentials;

a determination function for determining similarities of the two-dimensional images based on a result of comparison in the comparison function; and a three-dimensional model specification function for specifying a three-dimensional model associated with a two-dimensional image whose similarity is determined to be high in the determination function.

8. A three-dimensional model search system for searching for a specific three-dimensional model of a plurality of three-dimensional models, comprising:

a search object storage section for storing three-dimensional model information regarding the specific three-dimensional model and two-dimensional image infonnation regarding a plurality of two-dimensional images;

a comparison section for comparing a similarity of a two-dimensional image input as a search key with similarities of the plurality of two-dimensional images for which the two-dimensional image information is stored in the search object storage section, the comparison being carried out based on feature values, which are parameter values obtained based on color components as a histogram obtained by quantizing values for respective color information, which is contained as those image comnonents of image components in each of the two-dimensional images, which enable the similarities to be determined, and a shape histogram obtained by quantizing edge differentials;

a determination section for determining similarities of the two-dimensional images based on a result of comparison in the comparison section; and a three-dimensional model specification section for specifying a three-dimensional model associated with a two-dimensional image whose similarity is determined to be high in the determination section.

9. A three-dimensional model search apparatus for searching for a specific three-dimensional model of a plurality of three-dimensional models, comprising:

search object image production means for producing a plurality of two-dimensional images obtained by observing the specific three-dimensional model as an object of search from points of view different from one another based on the specific three-dimensional model;

a search object storage means for storing three-dimensional model information regarding the specific three-dimensional model and two-dimensional image information regarding the plurality of two-dimensional images;

search key input means for inputting a two-dimensional image as a search key;

a comparison means for comparing a similarity of the two-dimensional image input as the search key with similarities of the plurality of two-dimensional images for which the two-dimensional image information is stored in the search object storage mean, the comparison being carried out based on feature values, which are parameter values obtained based on color components as a histogram obtained by quantizing values for respective color information, which is contained as those image components of image components in each of the two-dimensional images, which enable the similarities to be determined, and a shape histogram obtained by quantizing edge differentials;

a determination means for determining similarities of the two-dimensional images based on a result of comparison in the comparison means; and a three-dimensional model specification means for specifying a three-dimensional model associated with a two-dimensional image whose similarity is determined to be high in the determination means.

* * * * *